United States Patent
Kratz et al.

(10) Patent No.: US 10,012,982 B2
(45) Date of Patent: Jul. 3, 2018

(54) SYSTEM AND METHOD FOR FOCUS AND CONTEXT VIEWS FOR TELEPRESENCE AND ROBOTIC TELEOPERATION

(71) Applicant: FUJI XEROX CO., LTD., Tokyo (JP)

(72) Inventors: Sven Kratz, San Jose, CA (US); James Vaughan, Sunnyvale, CA (US); Ryota Mizutani, Yokohama (JP); Donald Kimber, Foster City, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 201 days.

(21) Appl. No.: 14/966,428

(22) Filed: Dec. 11, 2015

(65) Prior Publication Data
US 2017/0168482 A1    Jun. 15, 2017

(51) Int. Cl.
G05D 1/00    (2006.01)

(52) U.S. Cl.
CPC ................... *G05D 1/0038* (2013.01)

(58) Field of Classification Search
CPC .................................................. G05D 1/0038
See application file for complete search history.

(56) References Cited

U.S. PATENT DOCUMENTS

| | | | | |
|---|---|---|---|---|
| 2015/0341603 A1* | 11/2015 | Kasmir | ........................ | H04N 5/33 348/143 |
| 2016/0127641 A1* | 5/2016 | Gove | ........................ | G06T 1/0007 348/143 |
| 2017/0070674 A1* | 3/2017 | Thurow | ........................ | H04N 7/181 |
| 2017/0106537 A1* | 4/2017 | Chizeck | ........................ | B25J 9/1689 |

OTHER PUBLICATIONS

Kevin Wayne Arthur, "Effects of Field of View on Performance with Head-Mounted Displays", Ph.D. Thesis, University of North Carolina, Chapel Hill, 2000.
Patrick Baudisch, Nathaniel Good, Victoria Bellotti & Pamela Schraedley, "Keeping things in context: a comparative evaluation of focus plus context screens, overviews, and zooming", CHI 2002 (Apr. 20-25, 2002).
Andy Cockburn, Amy Karlson & Benjamin Bederson, "A Review of Overview + Detail, Zooming, and Focus + Context Interfaces", ACM Computing Surveys, 2009.
Steven Johnson, Irene Rae, Bilge Mutlu, Leila Takayama, "Can You See Me Now? How field of View Affects Collaboration in Robotic Telepresence", CHI 2015 (Apr. 18-23, 2015).
Juho Kannala and Sami S., "A Generic Camera Model and Calibration Method for Conventional Wide-Angle, and Fish-Eye Lenses", IEEE Transactions on Pattern Analysis and Machine Intelligence, 2006.

(Continued)

*Primary Examiner* — Hussein Elchanti
(74) *Attorney, Agent, or Firm* — Procopio, Cory, Hargreaves & Savitch LLP

(57) ABSTRACT

Example implementations include a system and method for providing a focus and context view for a movable apparatus. The focus view is indicated in a central portion of the display, and a context view is warped around the focus portion of the display to provide context. In example implementations, selection of another portion to render as the focus portion causes the movable apparatus to orient itself to the focus portion as the forward direction.

18 Claims, 10 Drawing Sheets

(56) References Cited

OTHER PUBLICATIONS

Matthias Trapp, Interactive Rendering Techniques for Focus Context Visualization of 3D Geovirtual Environments, PhD. Thesis, Hasso Plattner Institute, University Potsdam, 2013.

Xin Zhao, Wei Zeng, Xianfen Gu, Arie Kaufman, Wei Xu and Klaus Mueller, "Conformal Magnifier: A Focus + Context Technique with Local Shape Preservation", IEEE Transactions on Visualization and Computer Graphics, 2012.

Shaun Williams. Blinky, Proof of concept to put peripheral vision into games. https://github.com/shaunlebron/blinky, 2015 (last accessed Dec. 10, 2015) [See also, https://www.youtube.com/watch?v=f9v_XN7Wxh8].

* cited by examiner

SYSTEM AND METHOD FOR FOCUS AND CONTEXT VIEWS FOR TELEPRESENCE AND ROBOTIC TELEOPERATION

BACKGROUND

Field

The present disclosure is directed generally to robot systems, and more specifically, to systems and methods of remotely controlling and managing robot systems.

Related Art

In the related art, manual robot teleoperation (e.g., control) with a video feed, via keyboard or joystick can be a frustrating and tedious task. Such related art implementations may also be error prone. For example, latency in the reception of the video, even in small amounts, can lead to collisions between the robot and objects, since the user sends commands based on out-of date information.

The related art methods for autonomous localization and navigation include generating a map through simultaneous localization and mapping techniques, and localizing within the map with the use of laser scanners or beacons. However, these related art techniques require an investment in time to setup and need to be updated as the environment changes.

Human vision provides the sense of a single comprehensive view of the surroundings. For a fixed position of each eye, humans have a horizontal field of view of about 120 degrees, of which only a small central foveal region has "high resolution". The fovea sees only about the central two degrees of the visual field, with a "resolution" of about 31.46 arc seconds. The fovea takes up about 1 percent of the retina, but over 50 percent of the visual cortex in the brain. Together, with both eyes looking forward, humans have about a 180 degree forward facing field of view. Using eye motion only (and not moving the head), humans have a field of view of about 270 degrees. Human brains integrate this so well that they are normally not aware of how low our resolution is outside of the small foveal region, nor of the need for saccades (e.g., quick, simultaneous movement of both eyes between two phases of fixation in the same direction, that may be associated with a shift in frequency of an emitted signal or a movement of a body part or device) to produce an overall visual sense of the space, nor even of head motions.

By contrast, when watching a view from a remote camera in the related art, there is a consistent resolution within the view, while nothing is seen outside of the view. This gives a sense of "tunnel vision", such as feeling removed from the remote space. Even if the camera is steerable or is on a robot or remote vehicle that can move around and turn, effort is needed to move the camera and make sense of the overall scene moves from the "perceptual" to "cognitive" level of mental processing. For highly immersive experiences, a user can be provided with a head-mounted-display having a field of view (FOV) close to that of the eye, and a head tracker so that head motion provides essentially the same view as if they were at the remote location. Alternatively, the user may sit in a "CAVE" with video shown on the walls or other surrounding surface. For many related art applications however, these are not practical or are otherwise undesirable. Providing such views requires high bandwidth, low latency networking, more elaborate hardware, or requires the user to be wearing an unnatural device and essentially be disconnected from their own local environment. A user may prefer, for example, to be watching the view on a large display, in a web page, or on a tablet.

SUMMARY

Example methods for giving people wide views or peripheral awareness for remote robotic control or surveillance are the use of multiple cameras, or by use of a wide field of view lens. Multiple camera views can be hard to understand, while a wide field of view lens creates distortion throughout the whole image, or an undesirable "stretched" image for views close to 180 degrees. Example implementations provide integration of view-panning and rotation of a robotic base which may provide a remote operator with a less confusing experience.

Aspects of the present disclosure can include a first apparatus configured to navigate a movable second apparatus. The first apparatus may involve a display; and a processor, configured to process each of one or more camera images from the movable second apparatus into a first region and a second region, the second region being a warped image surrounding the first region, the first region being a central region of the each of the one or more camera images, the first region and the second region generated by a continuous distortion function; and for receipt of a selected portion of the display from an input: process the selected portion as the first region; determine the second region from the one or more camera images based on the selected portion; and instruct the movable second apparatus to be oriented in a forward direction based on the selected portion. The second region may be a panoramic region of the processed image.

Aspects of the present disclosure further include a non-transitory computer readable medium storing instructions for executing a process for a first apparatus configured to navigate a movable second apparatus. The instructions can involve processing each of one or more camera images from the movable second apparatus into a first region and a second region, the second region being a warped image surrounding the first region, the first region being a central region of the each of the one or more camera images, the first region and the second region generated by a continuous distortion function; and for receipt of a selected portion of the display from an input: processing the selected portion as the first region; determining the second region from the one or more camera images based on the selected portion; and instructing the movable second apparatus to be oriented in a forward direction based on the selected portion. In the case where the direction of the generated image does not correspond with the robot's direction of travel, the robot can be rotated towards this direction, while the view direction is simultaneously adjusted, so that the user is unaware of the rotation.

Aspects of the present disclosure further include a method for a first apparatus configured to navigate a movable second apparatus. The method can involve processing each of one or more camera images from the movable second apparatus into a first region and a second region, the second region being a warped image surrounding the first region, the first region being a central region of the each of the one or more camera images, the first region and the second region generated by a continuous distortion function; and for receipt of a selected portion of the display from an input: processing the selected portion as the first region; determining the second region from the one or more camera images based on the selected portion; and instructing the movable second apparatus to be oriented in a forward direction based on the selected portion.

Aspects of the present disclosure may further include a system which may involve means for processing each of one or more camera images from the movable second apparatus into a first region and a second region, the second region being a warped image surrounding the first region, the first region being a central region of the each of the one or more camera images, the first region and the second region generated by a continuous distortion function; and for receipt of a selected portion of display means from an input: means for processing the selected portion as the first region; means for determining the second region from the one or more camera images based on the selected portion; and means for instructing the movable second apparatus to be oriented in a forward direction based on the selected portion.

DETAILED DESCRIPTION

Figure 1:
FIG. 1 illustrates examples of wide-angle lenses.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Further, although example implementations as described herein are described in context of a movable robot, the example implementations can apply to any movable apparatus (e.g., remote control car) and are not limited to a robot.

To address the problem of tunnel vision, and provide effortless peripheral vision in a simple single window display, example implementations include specially constructed focus plus context (F+C) views. Focus plus context methods have been applied for information visualizations purposes in the related art, but have not been explored in the related art for video telepresence or teleoperation.

FIG. 1 illustrates examples of wide-angle lenses, including "fisheye lenses" that are widely used but are different from the proposed focus plus context views of example implementations. Wide angle views which preserve perspective (i.e., corresponding to a pinhole camera model) are limited to a maximum field of view (FOV) of 180 degrees, and become very "area distorted" as the FOV gets larger than about 160 degrees FOV.

The elements of the example implementations are a camera system that provides a focus plus context view, which is undistorted in a central region, and shows a large amount of periphery in the surrounding area. This view could be provided by special Focus+Context mirror or lens systems, but the design of such systems can be difficult and may require complex mounting or multiple mirrors/lenses. A more practical solution can involve the digital warping of images from panoramic or very wide angle cameras. An ideal image warping should have the property that there are no discontinuities in the overall image. In the central undistorted regions, straight lines in the world should map to straight lines in the image (corresponding to a perspective camera.) Although it is not possible to map straight lines to straight lines over a full 360 field of view, lines can be mapped to continuous paths ideally with continuous derivatives (so as to not introduce corners).

In example implementations for producing F+C views, there is digital re-warping of images into views with the designed properties. In example implementations, the input can include a very wide angle or panoramic imaging system that may involve multiple cameras, or a single camera with a very wide angle "fisheye" lens as illustrated in FIG. 1. Wide-angle lenses are available with up to 240 degrees FOV. The output of such a camera system is then mapped to a view in a given direction, where the central pixel of the view corresponds to that direction, and pixels further from the center are progressively greater angles from that direction.

Example implementations are directed to telepresence, particularly for robotic control. In example implementations, the interface facilitates the user to visualize an object from the periphery, and bring the periphery into focus for an undistorted view. In example implementations, the periphery can be brought into view by dragging a point anywhere on the image towards the central focus region. In other example implementations, the periphery can be brought into view by a user action (e.g., double click) on a point anywhere in the image. This can animate the view for a smoother transition so that the specified point is seen in focus. This appears to the user as though the camera is moving towards the selective point, until it is centered in view.

One example implementation for bringing the periphery into view leaves the robot (and physical camera) in a fixed position, and determines a new virtual view. That can be desirable for looking around, in the case that the remote camera is simply a fixed panoramic camera with no robot or motorized platform. Another scenario is that when the user clicks a point anywhere in the image, the robot (or platform) rotates to bring that into focus.

Hybrid methods could also be considered, depending on the desired implementation. For rapid looking around, virtual panning can be smoother and more rapid than moving a physical device with inertia. However, when the robot is moved, the view can be very confusing when forward motion of the robot is not in the direction of the camera. Some robots, when equipped with a holonomic wheel system, can strafe, or move directly in any direction. However, many robots have a "forward direction" and must first rotate to the target direction before moving. This rotation can be incorporated into a focus plus context panoramic interface, so that wherever the user is looking, if they request to move forward, the robot first rotates to that position while simultaneously adjusting the virtual view to continue looking in a fixed direction as the robot rotates.

Example implementations produce a view image showing a central undistorted (perspectively correct) region surrounded by a warped larger peripheral image, joined seamlessly (i.e. without discontinuities or artificial corners.) Each pixel of the view image corresponds to some direction in space, and must be provided by the pixel from input camera (s) corresponding to that direction. Pixels may also be generated by an interpolated value of the input pixels closest to the desired direction. The central undistorted region and the warped larger peripheral region are generated continuously and seamlessly through the use of a continuous distortion function as described below.

Figure 2A:
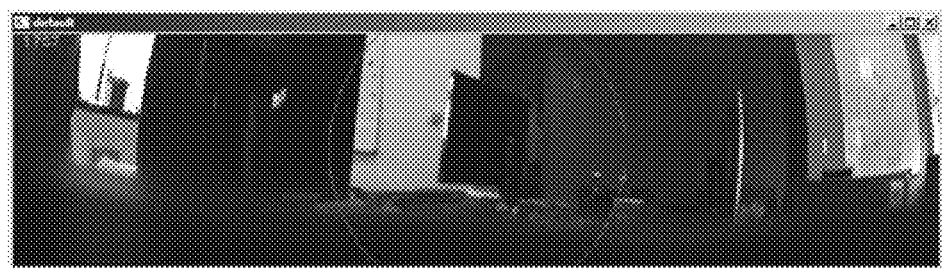
FIGS. 2(a) and 2(b) illustrate example virtual views in accordance with an example implementation.
Figure 2B:
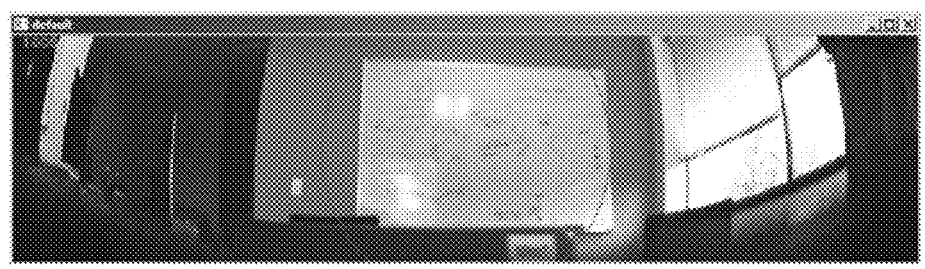

FIGS. 2(a) and 2(b) illustrate example virtual views in accordance with an example implementation. In FIGS. 2(a) and 2(b), the focused portion is the central region, which is made larger and undistorted. The periphery is compressed and is distorted so that the straight lines appear curved. In FIG. 2(a), the virtual view shows the back of a computer monitor in focus, and a whiteboard in the periphery to the right. Double clicking a point on the whiteboard brings that point to the center for an undistorted focused view as illustrated in FIG. 2(b).

Many methods of warping are possible, and one example method involves radially symmetric warping functions. Consider a virtual camera pointed in some direction, so that the principle ray corresponds to a vector n from the optical center through the central pixel. A given pixel at view image coordinates $v_x, v_y$ corresponds to a ray in some given direction given by a normal vector v. In the view image, example implementations may convert the view image to polar coordinates $\theta$, r. Note that the angle $\alpha$ between n and v is given by $\alpha = \tan^{-1} r/f$. where f is the focal length of the virtual camera. A natural class of distortions are radially symmetric, described by $\theta \rightarrow \theta$, and $r \rightarrow \theta d(r)$ for some monotonically increasing function d. (If d is non-monotonic some pixels (view directions) could be replicated in the image.) For $d(r)=kr$ for some fixed constant k, the effect is the same as "magnifying" the image uniformly by 1/k (equivalent to using a longer focal length to get a narrower field of view.) In example implementations, pick $d(r)=kr$ for $r<=r_0$ to generate a view matching a perspective camera inside the circle with radius $r_0$. Outside of $r_0$ example implementations can let d(r) grow faster than linearly, to push more peripheral view into the generated view. As long as d(r) is chosen to be continuous and differentiable, the example implementations will not introduce any discontinuities into the image, and will avoid introducing corners into the images of lines.

Note that there is an apparent limitation of this method, in that no matter how fast d(r) grows, it may not generate a field of view greater than 180. That is because $\alpha = \tan^{-1} r/f$ asymptotically approaches $\pi/2$ (that is, 90 degrees from the principle direction n) as d(r) goes to infinity. However, this limitation may be easily overcome by re-parameterizing view coordinates as $\theta$, $\alpha$ rather than $\theta$,r. That is, example implementations map $v_x, v_y$ to $\theta, \alpha$ rather than to $\theta$,r where $\alpha = \tan^{-1} r/f$, and then produce the distortion by mapping $\alpha = d_\alpha(\alpha)$. Here $d_\alpha$ is d(r) re-parameterized from r to $\alpha$. So for $\alpha < \alpha_0 = \tan^{-1} r_0/f$ if there is $d_\alpha(\alpha) = \tan^{-1} (k f \tan(\alpha))/f$ the result may involve a perspectively correct image with magnification 1/k inside $r_0$, but outside $r_0$, example implementations can let a grow all the way to 180 for a total field of view of 360.

Figure 3:
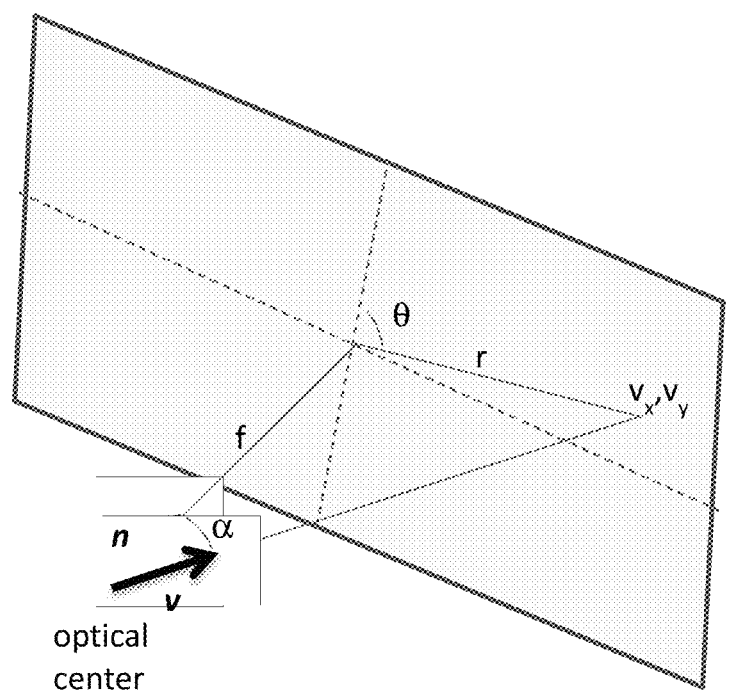
FIG. 3 illustrates a geometry of view generation, in accordance with an example implementation.

FIG. 3 illustrates a geometry of view generation, in accordance with an example implementation. The view plane is like an image plane a distance f from optical center, (f is the focal length.) The direction from optical center to the center pixel corresponds to a vector n, and the direction to an arbitrary pixel at $v_x, v_y$ is v. $v_x, v_y$ may be expressed in polar coordinates as $\theta$, r. The angle between v and n is $\alpha = \tan^{-1} r/f$.

In an example implementation, the geometry of view generation is applied to the interface. With the focus plus context view, from the user perspective the robot has a forward direction in the sense of its wheels. So the forward direction of the robot is pointed towards that green thing and the users sees that in focus and they see something off to the side in the focus-plus context view and if they click on that then there is several things that could happen.

Thus in example implementations, the camera can be virtually panned while the robot remains stationary through the use of the focus plus context implementations. In example implementations involving a 360 degree camera, the user can select any portion of the video and then refocus within the selected portion, and thus the virtual view is changed.

In such example implementations described above, the view presented may be directed at a direction that is not the forward direction of the robot. Should an input be made by the user to navigate the robot, the resulting view provided may be confusing as the view may not be the forward view, and the robot is not navigating forward with respect to the view. To navigate, the user may have to move the virtual view back to the forward direction before the robot can be navigated.

In example implementations, when an input is received for a point in the view, the robot can be configured to move such that the robot interprets the operation to move in the selected direction. Further, in example implementations the virtual view can be maintained so that as the robot moves, the view is kept at center through the focus plus context implementation. In such example implementations, selection within the view would change the view to the center, and the robot configures itself to change the direction to bring the selected view as the forward direction in response to the selection. This can include having the robot rotate in place, or other methods depending on the desired implementation.

In example implementations utilizing the focus plus context views as described above, the diagonal field of view can become roughly 256 degrees. Example implementations improve on a perspective camera wherein even if the perspective camera is extended to be as wide angle as possible, the maximum field of view is 180 degrees. Thus, additional peripheral vision can be added into the image.

In example implementations, the camera images are processed as a focused portion and a context portion, wherein the context portion is warped around the focused portion on a display. When the view is provided, the indication is provided to indicate the forward direction of the movable apparatus to be controlled (e.g., forward direction from the wheels perspective of the movable apparatus, forward direction from the camera array perspective of the apparatus, etc.).

In example implementations, the forward direction is set as the focused portion. Upon receipt of an input on another part of the display (e.g., via touchscreen, mouse input and so on), the camera can be virtually panned to the desired portion, and the camera images are reprocessed to provide the desired portion as the focus portion. In such example implementations, the controlled movable apparatus may remain stationary, and only the virtual view is changed.

In further example implementations, the movable apparatus may be instructed to rotate to bring the forward direction of the movable apparatus to the selected portion.

Such implementations can address the problem wherein the displayed view is some direction that is not forward of the movable apparatus. When input is made to navigate the movable apparatus, the resultant view may be confusing, forcing the user to navigate the virtual view back to the forward direction before the movable apparatus is navigated.

Thus, example implementations introduce a mode wherein when an input is made to select a portion of the virtual view, the movable apparatus rotates to orient itself to render the selected portion to be the forward direction of the movable apparatus. In another example implementation mode, when an input is made to select a portion of the virtual view, the movable apparatus can be instructed to move in the direction indicated by the selected portion, while the virtual view is maintained such that the selected portion is centered as the focused portion. Thus, when the movable apparatus is moving, the virtual view may be changed as if the movable apparatus is moving in the direction specified by the input.

Figure 4:
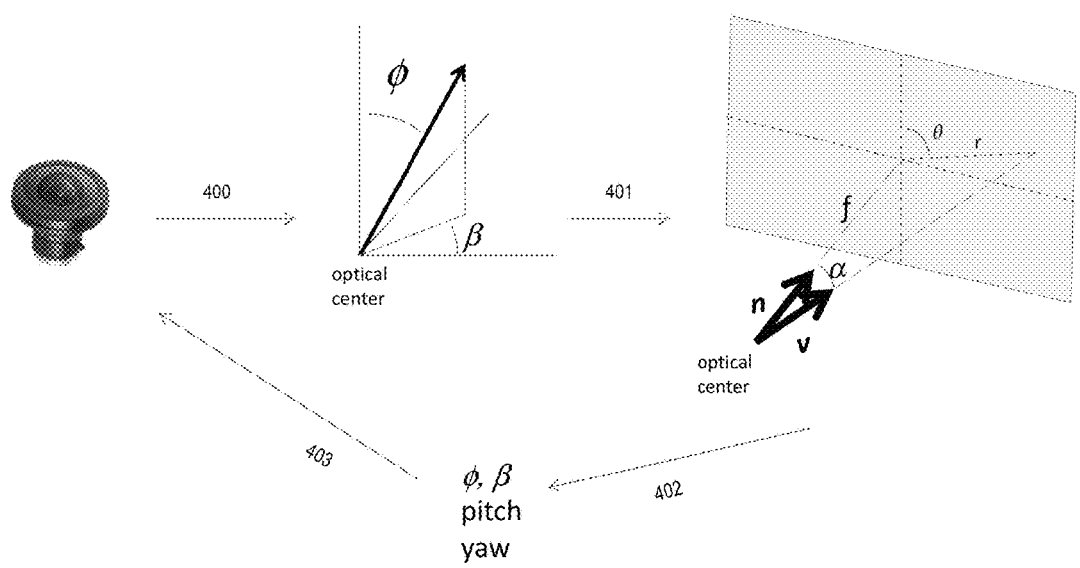
FIG. 4 illustrates an example flow for view generation, in accordance with an example implementation.

FIG. 4 illustrates an example flow for view generation, in accordance with an example implementation. At 400, camera images are processed from cameras. The cameras can be 360 or other wide angle cameras as illustrated in FIG. 1. The processing includes deriving the optical center from pitch ϕ, and yaw β. Based on the determination, example implementations can be configured to determine the central portion at 401, which is then processed for focusing to generate the focused portion as illustrated in FIG. 3. The remaining portions of the camera images are processed as the context portion that is warped around the focused portion. For this processing at 402, for each pixel in virtual view, the flow computes the directions, the pitch ϕ, and the yaw β. At 403, for each of the pitch ϕ, and the yaw β, the flow obtains the nearest pixel from the camera images in the camera. Such pixels are obtained and then warped around the central portion as the context portion.

Figure 5A:
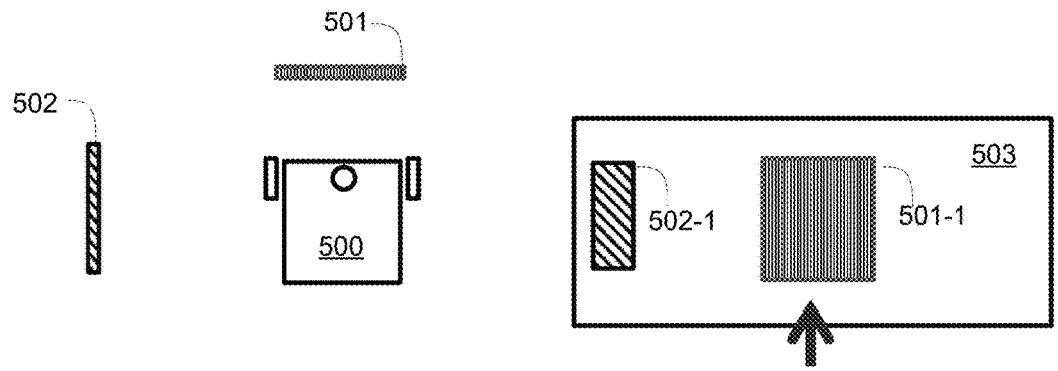
FIGS. 5(a) to 5(c) illustrate examples of camera and control modes for the movable apparatus, in accordance with an example implementation.
Figure 5B:
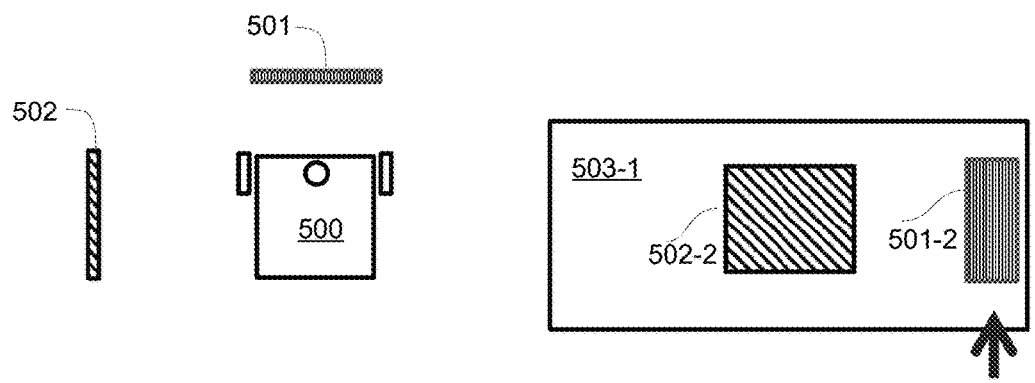
Figure 5C:
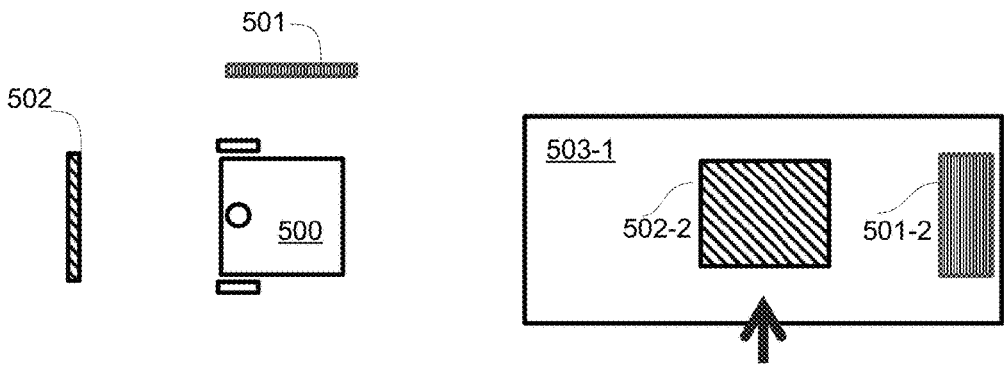

FIGS. 5(a) to 5(c) illustrate examples of camera and control modes for the movable apparatus, in accordance with an example implementation. In FIG. 5(a), movable apparatus 500 is facing towards object 501, which appears in display 503 as object 501-1. The focused portion is provided for the center of display 503 which appears as object 501-1. Object 502 is displayed in the display 503 as the context portion as object 502-1. The arrow indicates the forward orientation of the movable apparatus 500. In the example of FIG. 5(b), the user selects the context object 502-1 as the focus portion. The context object is then brought into focus as the focus object as illustrated in display 503-1 with object 502-2. The original focus object is then moved into the context portion and warped around the side of the focus portion in context as illustrated in display 503-1 with object 501-2. Although the virtual view is changed, the movable apparatus 500 remains stationary, as illustrated in FIG. 5(b). The arrow in FIG. 5(b) illustrates that the forward orientation of the movable apparatus is still directed to object 501 and context object 501-2.

When a different portion is selected as the focus portion as illustrated in FIG. 5(b), the movable apparatus 500 may be configured to orient itself to have the forward direction of the movable apparatus oriented towards the selected focus portion. In the example of FIG. 5(c), the movable apparatus 500 orients itself to have the forward direction towards object 502 by rotating in place.

Figure 6A:
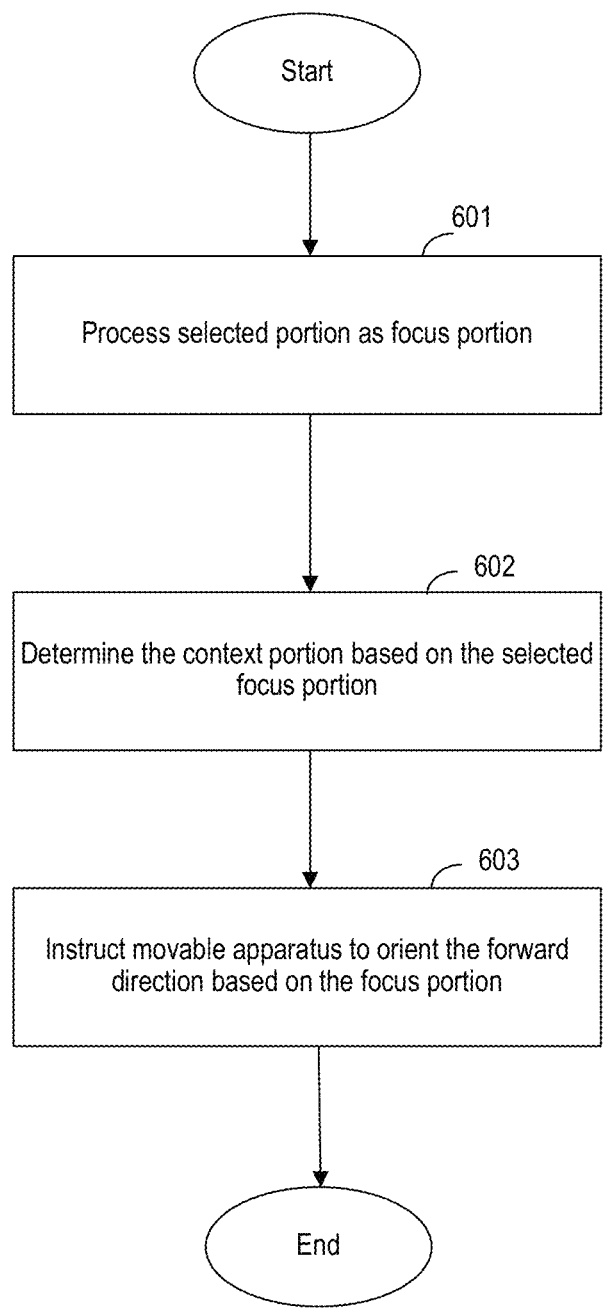
FIGS. 6(a) to 6(c) illustrate flow diagrams in accordance with an example implementation.

FIG. 6(a) illustrates a flow diagram in accordance with an example implementation. In this flow diagram, an apparatus controlling the movable apparatus receives a selected portion for the focus portion as illustrated in FIG. 5(b). At 601, the flow processes the selected portion as the focus portion. The new focus portion is derived from the camera images provided from the 360 degree camera or wide angle camera, and then processed based on the flow of FIG. 3 and FIG. 4. At 602, the flow determines the context portion from the camera images based on the new focused portion in accordance with the flows of FIG. 3 and FIG. 4. At 603, instructions can be sent to the movable apparatus to orient the forward direction of the movable apparatus based on the selected portion. In an example implementation, should inputs be received to move the movable apparatus while the movable apparatus is orienting itself so that the forward direction is the selected portion, the movable apparatus can also be configured to wait until it has oriented, and then move based on the input. In this manner, the operator of the movable apparatus can be assured that when an input is made to move the movable apparatus, the camera view provided is the front view and the movable apparatus will hold the instructions until the rotation of the movable apparatus to orient itself according to the camera view is complete.

Figure 6B:
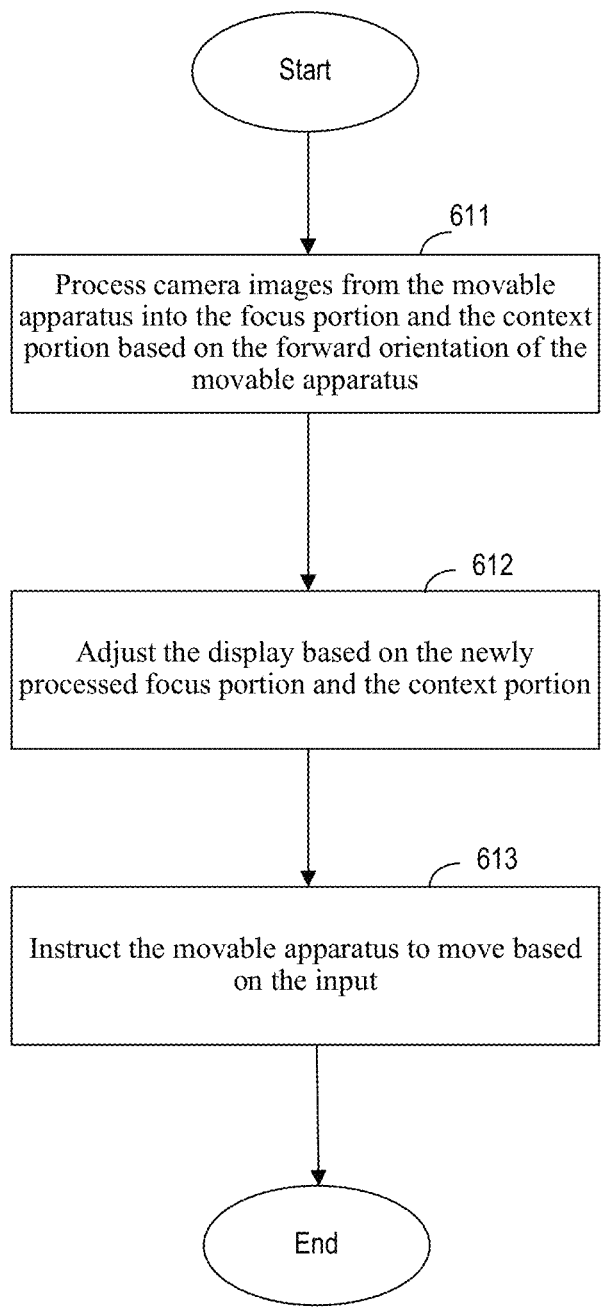

FIG. 6(b) illustrates a flow diagram in accordance with an example implementation. In one example implementation, an input is made to the apparatus to move the movable apparatus while the movable apparatus is orienting the forward direction of the movable apparatus based on a selected focus portion. During this process, at 611, the apparatus processes camera images from the movable apparatus into the focus portion and the context portion based on the forward orientation of the movable apparatus. At 612, the apparatus adjusts the display based on the newly processed focus portion and the context portion. At 613, the apparatus then instructs the movable apparatus to move based on the input. In this example implementation, upon receipt of an input, the display changes immediately to change the focus portion directly to the present forward orientation of the movable apparatus, and the context portion around the forward orientation of the movable apparatus, and then the movable apparatus is moved according to the input.

Figure 6C:
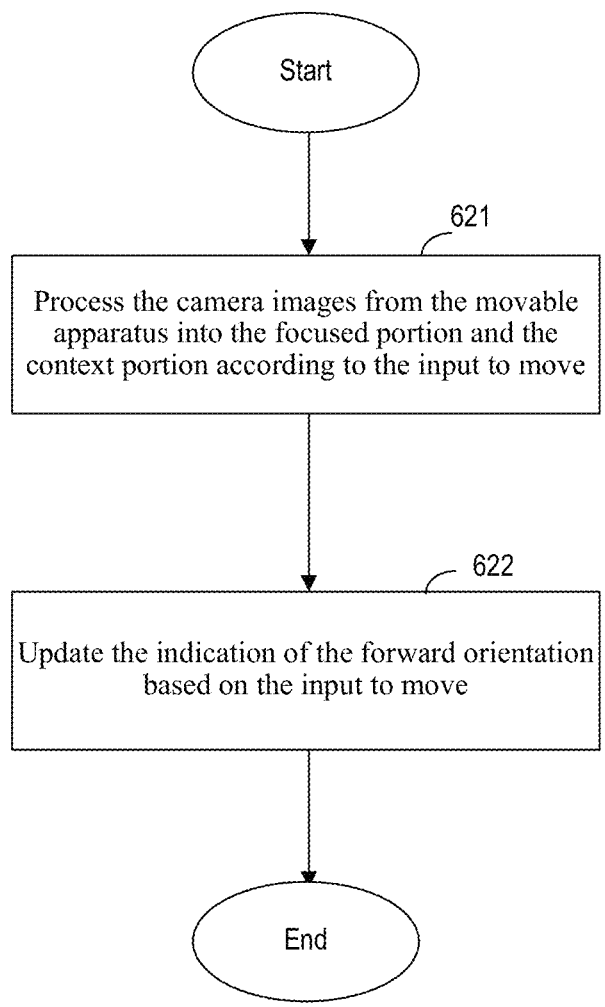

FIG. 6(c) illustrates a flow diagram in accordance with an example implementation. In an example implementation, an input is made to move the movable apparatus while the movable apparatus is orienting itself to cause the forward direction of the movable apparatus to be towards the selected focus portion. At 621, the apparatus processes the camera images from the movable apparatus into the focused portion and the context portion according to the input to move. At 622, the apparatus updates the indication of the forward orientation based on the input to move. In this example implementation, an indication is provided on the display to indicate the forward orientation of the movable apparatus. When an input is made to move the movable apparatus, the movable apparatus moves according to its forward orientation. However, the perspective of the selected focus portion is maintained, and the indication is updated to indicate where the forward orientation of the movable apparatus is operated. Thus, the virtual view is changed as if the movable apparatus had moved in the chosen direction based on the camera. In this example implementation, the movable apparatus may also be configured to remain stationary and zoom in on the focus portion and the context portion as if the movable apparatus had moved according to the input.

Figure 7:
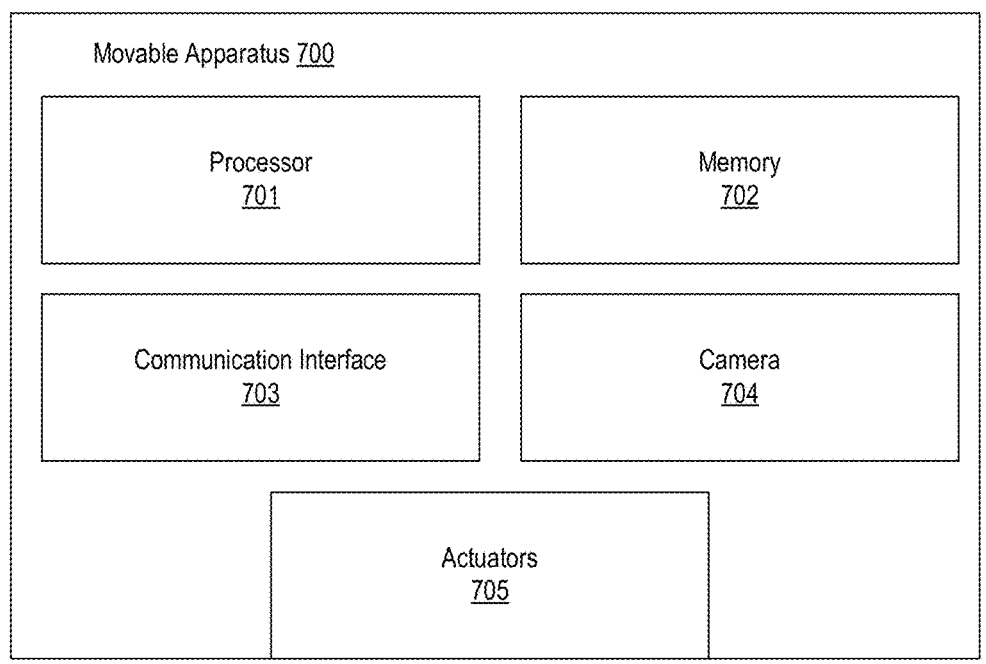
FIG. 7 illustrates an example hardware diagram for a movable apparatus, in accordance with an example implementation.

FIG. 7 illustrates an example hardware diagram for a movable apparatus, in accordance with an example implementation. The movable apparatus 700 may include a processor 701, a memory 702, a communication interface with a baseband processor 703, one or more sensors 704, and one or more actuators 705. Memory 702 may store instructions that can be loaded into processor 701 to execute the flow diagram as illustrated, for example, in FIG. 7. Communication interface 703 may be configured to receive instructions from the apparatus of FIG. 8 as illustrated in FIGS. 6(*a*) to 6(*c*) and store the instructions into memory 702 for execution by the processor. Camera 704 can include cameras such as 360 degree cameras or wide angle cameras to obtain camera images suitable for the focus and context processing as illustrated in FIGS. 3 and 4, which are sent back to the apparatus of FIG. 8 through the communication interface 703. Actuators 705 can be configured to navigate and move the movable apparatus 700. In example implementations, the movable apparatus 700 can be a movable robot, but other implementations are also possible depending on the desired implementation. For example, the movable apparatus 700 can be an array of security cameras that provide surveillance through movable cameras, thereby having one or more cameras 704 capable of moving depending on the desired implementation.

Figure 8:
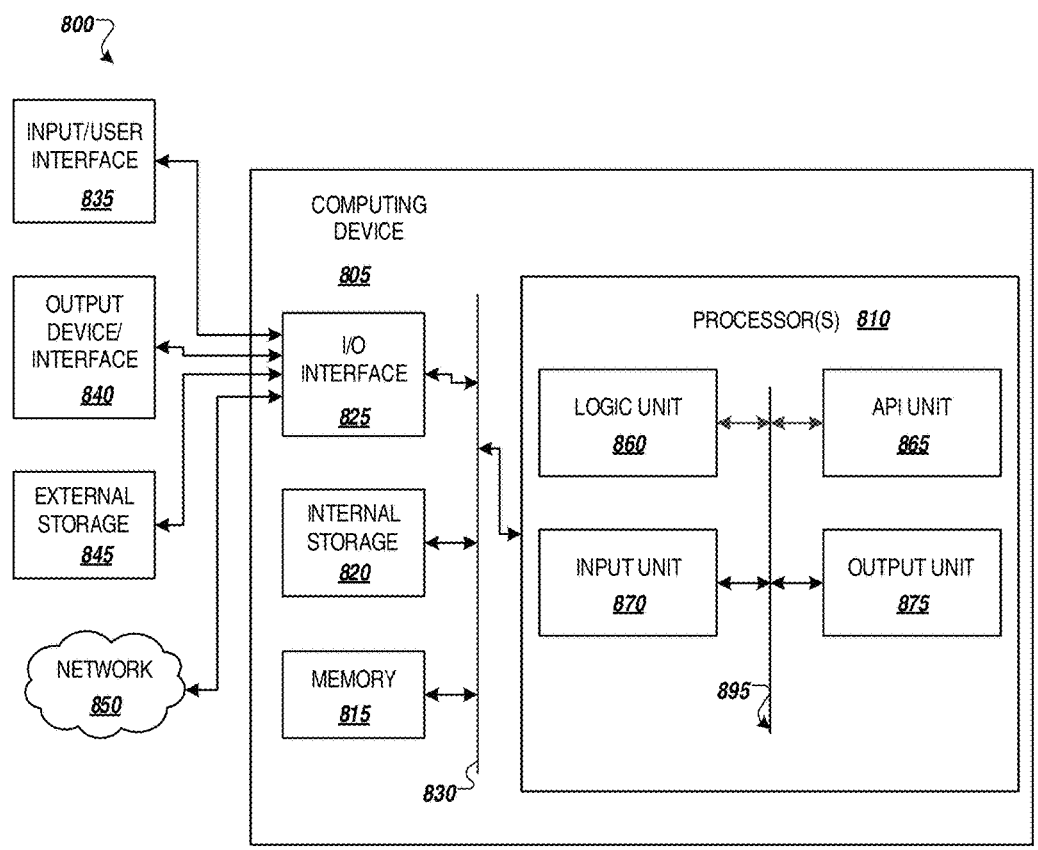
FIG. 8 illustrates an example computing environment with an example computer device suitable for use in some example implementations.

FIG. 8 illustrates an example computing environment with an example computer device suitable for use in some example implementations, such as an apparatus to facilitate the functionality of navigating another movable apparatus. Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computer device 805.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via I/O interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide output based on the calculations described in example implementations.

Processor(s) 810 can be configured to receive camera images from the movable apparatus 700 and process them for a first region that is a focused portion and a second region that is the context portion in accordance with the flow diagrams of FIGS. 3 and 4. Processor(s) 810 can warp the context portions of the camera images around the focused portions in accordance with the flow diagrams of FIGS. 3 and 4. Processor(s) 810 may also be configured to instruct movable apparatus 700 to move in accordance with received movement instructions as illustrated in FIGS. 6(*a*) to 6(*c*). Thus, in example implementations, processor(s) may process each of one or more camera images from the movable apparatus into the first region and the second region, the second region being a warped image surrounding the first region, the first region being a central region of the each of the one or more camera images, with the first region and the second region generated by a continuous distortion function so as to provide continuity between the first region and the second region. In example implementations, the processing of the images according to the continuous distortion function may also be done by the movable apparatus 700 depending on the desired implementation.

Processor(s) 810 may also be instructed to receive input to render another portion of the camera images to be the focused portion based on an input received. The input can be made through input interface 835 and the focused portion is updated to be the selected portion. Context portions are also updated based on the selected focused portion. In additional example implementations, processor(s) 810 may also be configured to provide an indication on the display to indicate the forward orientation of the movable apparatus 700.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A first apparatus configured to navigate a movable second apparatus, the first apparatus comprising:
a processor, configured to:
process each of one or more camera images from the movable second apparatus into a first region and a second region, the second region being a warped image surrounding the first region, the first region being a central region of the each of the one or more camera images, the first region and the second region generated by a continuous distortion function; and
for receipt of a selected portion of the display from an input:
process the selected portion as the first region;
determine the second region from the one or more camera images based on the selected portion; and
instruct the movable second apparatus to be oriented in a forward direction based on the selected portion.

2. The first apparatus of claim 1, wherein the one or more camera images are provided from at least one of a fish-eye camera and a 360 degree camera.

3. The first apparatus of claim 1, wherein the processor is configured to process the one or more images into the first region by generating a focused portion from the one or more images.

4. The first apparatus of claim 1, wherein the processor is configured to, for an input to move the movable second apparatus while the movable second apparatus is orienting the forward direction of the movable second apparatus based on the selected portion, provide instructions to the movable second apparatus to move based on the input on receipt from the movable second apparatus that the orienting is complete.

5. The first apparatus of claim 1, wherein the processor is configured to:
   for an input to move the movable second apparatus while the movable second apparatus is orienting the forward direction of the movable second apparatus based on the selected portion:
     process the each of the one or more camera images from the movable second apparatus into the first region and the second region based on the forward orientation of the movable second apparatus;
     adjust the display based on the processed first region and the second region; and
     instruct the movable second apparatus to move based on the input.

6. The first apparatus of claim 1, wherein the processor is configured to:
   provide, on the display, an indication of the forward orientation of the movable second apparatus;
   for an input to move the movable second apparatus while the movable second apparatus is orienting the forward direction of the movable second apparatus based on the selected portion:
     process the one or more camera images from the movable second apparatus into the first region and the second region according to the input to move; and
     update the indication of the forward orientation based on the input to move.

7. A method for a first apparatus configured to navigate a movable second apparatus, the method comprising:
   processing each of one or more camera images from the movable second apparatus into a first region and a second region, the second region being a warped image surrounding the first region, the first region being a central region of the each of the one or more camera images, the first region and the second region generated by a continuous distortion function; and
   for receipt of a selected portion of the display from an input:
     processing the selected portion as the first region;
     determining the second region from the one or more camera images based on the selected portion; and
     instructing the movable second apparatus to be oriented in a forward direction based on the selected portion.

8. The method of claim 7, wherein the one or more camera images are provided from at least one of a fish-eye camera and a 360 degree camera.

9. The method of claim 7, wherein the processing the one or more images into the first region comprises generating a focused portion from the one or more images.

10. The method of claim 7, further comprising, for an input to move the movable second apparatus while the movable second apparatus is orienting the forward direction of the movable second apparatus based on the selected portion, providing instructions to the movable second apparatus to move based on the input on receipt from the movable second apparatus that the orienting is complete.

11. The method of claim 7, further comprising:
   for an input to move the movable second apparatus while the movable second apparatus is orienting the forward direction of the movable second apparatus based on the selected portion:
     processing the one or more camera images from the movable second apparatus into the first region and the second region based on the forward orientation of the movable second apparatus;
     adjusting the display based on the processed first region and the second region; and
     instructing the movable second apparatus to move based on the input.

12. The method of claim 7, further comprising:
   providing, on the display, an indication of the forward orientation of the movable second apparatus;
   for an input to move the movable second apparatus while the movable second apparatus is orienting the forward direction of the movable second apparatus based on the selected portion:
     processing the one or more camera images from the movable second apparatus into the first region and the second region according to the input to move; and
     updating the indication of the forward orientation based on the input to move.

13. A non-transitory computer readable medium storing instructions for a first apparatus configured to navigate a movable second apparatus, the instructions comprising:
   processing each of one or more camera images from the movable second apparatus into a first region and a second region, the second region being a warped image surrounding the first region, the first region being a central region of the each of the one or more camera images, the first region and the second region generated by a continuous distortion function; and
   for receipt of a selected portion of the display from an input:
     processing the selected portion as the first region;
     determining the second region from the one or more camera images based on the selected portion; and
     instructing the movable second apparatus to be oriented in a forward direction based on the selected portion.

14. The non-transitory computer readable medium of claim 13, wherein the one or more camera images are provided from at least one of a fish-eye camera and a 360 degree camera.

15. The non-transitory computer readable medium of claim 13, wherein the processing the one or more images into the first region comprises generating a focused portion from the one or more images.

16. The non-transitory computer readable medium of claim 13, the instructions further comprising, for an input to move the movable second apparatus while the movable second apparatus is orienting the forward direction of the movable second apparatus based on the selected portion, providing instructions to the movable second apparatus to move based on the input on receipt from the movable second apparatus that the orienting is complete.

17. The non-transitory computer readable medium of claim 13, the instructions further comprising:
   for an input to move the movable second apparatus while the movable second apparatus is orienting the forward direction of the movable second apparatus based on the selected portion:
     processing the one or more camera images from the movable second apparatus into the first region and the second region based on the forward orientation of the movable second apparatus;
     adjusting the display based on the processed first region and the second region; and
     instructing the movable second apparatus to move based on the input.

18. The non-transitory computer readable medium of claim 13, the instructions further comprising:

providing, on the display, an indication of the forward orientation of the movable second apparatus;
for an input to move the movable second apparatus while the movable second apparatus is orienting the forward direction of the movable second apparatus based on the selected portion:
  processing the one or more camera images from the movable second apparatus into the first region and the second region according to the input to move; and
updating the indication of the forward orientation based on the input to move.

\* \* \* \* \*